United States Patent Office 2,992,015
Patented July 11, 1961

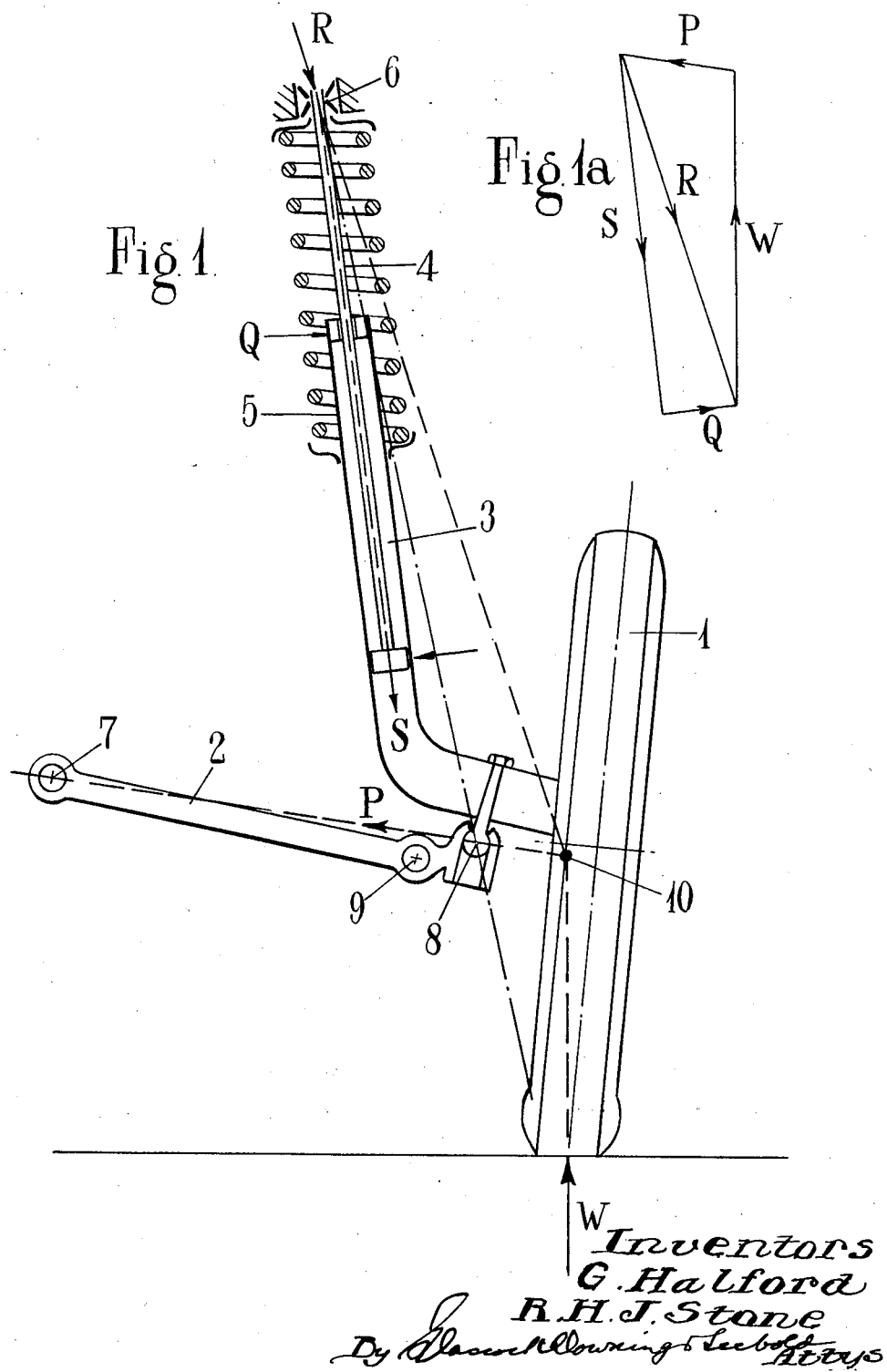

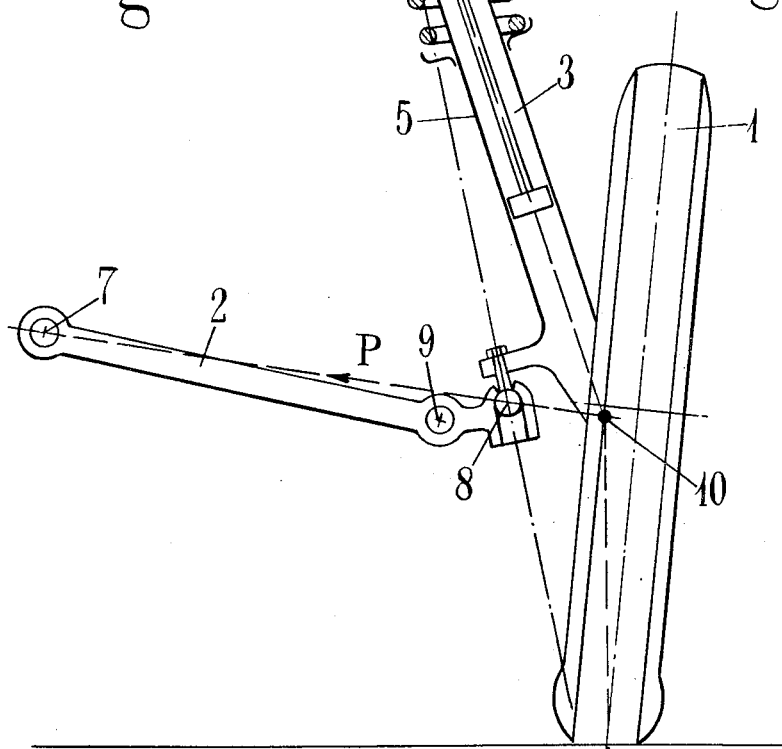

1

2,992,015
MOTOR VEHICLE INDEPENDENT WHEEL SUSPENSIONS
George Halford, Loughton, and Ronald Henry James Stone, Brentwood, England, assignors to Ford Motor Company Limited, London, England
Filed June 10, 1959, Ser. No. 819,291
Claims priority, application Great Britain June 11, 1958
1 Claim. (Cl. 280—124)

This invention relates to independent wheel suspensions, and more particularly that type of wheel suspension comprising a generally vertical telescopic strut and a generally horizontal, transverse track control arm.

Such an independent wheel suspension is described in British patent specification 658,387.

Suspensions of this type are liable to be such that a bending movement is applied to the telescopic strut thereby producing a lateral force tending to cause jamming of the sliding bearing interposed between the piston and cylinder of the strut.

It is an object of the invention to overcome or mitigate this disadvantage.

The invention consists of an independent wheel suspension of the type described in which the axis of the telescopic strut intersects the effective axis of the track control arm at a point substantially in the vertical plane through the centre of ground contact of the wheel.

The invention will be further described with reference to the accompanying drawings, wherein:

FIGURE 1 is a diagrammatic view of a known type of front suspension,

FIGURE 1a is a corresponding force diagram,

FIGURE 2 is a view similar to FIGURE 1 of a suspension according to the invention, and FIGURE 2a is a corresponding force diagram.

Referring first to FIGURE 1, there is shown a road wheel 1 suspended by a generally horizontal transverse track control arm 2 and a telescopic strut 3, comprising a piston rod 4 and cylinder 5, secured to the vehicle frame at 6. For convenience cylinder 5 is shown as integral with the wheel hub. Track control arm 2 is pivoted to the vehicle frame at 7 and universally articulated at 8 with the wheel hub and the line 7—8 is the

2 effective axis of the arm 2. Arm 2 is also adapted at 9 to take a longitudinal suspension arm.

FIGURE 1a represents a force diagram for this suspension. W represents the vertical load through the point of ground contact and this intersects the effective axis of arm 2 in a point 10. The contribution from the arm 2 is a force P along the effective axis and for equilibrium a force R must act along the line 6—10 as shown. Such force R consists of an axial component S in the telescopic strut 3 and a lateral component Q, which is the unwanted force, acting between the piston rod 4 and its bearing in cylinder 5.

In the suspension shown in FIGURE 2, which is the ideal form of the invention wherein the force Q is completely eliminated, the axis of the telescopic strut coincides with the line 6—10 and hence R and S are the same force as shown in FIGURE 2a.

According to the invention the axis of the telescopic strut 3 should intersect the effective axis 7—8 of arm 2 at point 10 but it may be slightly displaced on either side of point 10.

Thus, the axis may be slightly more or slightly less inclined to the vertical than shown in FIGURE 2.

Various modifications may be made within the scope of the invention.

We claim:

An independent suspension for a front steerable road wheel of a motor vehicle, comprising a wheel support, a generally vertically extending telescopic strut having its lower end solid with the wheel support and its upper end mounted in the vehicle, and a generally horizontally extending transverse track control arm having an outer end universally articulated to the wheel support and its inner end pivoted to the vehicle, in which the longitudinal axis of the telescopic strut intersects the effective longitudinal axis of the track control arm at a point lying substantially in the vertical plane extending longitudinally of the vehicle through the center of ground contact of the wheel.

References Cited in the file of this patent
UNITED STATES PATENTS

| | | |
|---|---|---|
| 1,041,097 | Kennedy | Oct. 15, 1912 |
| 2,018,653 | Best | Oct. 29, 1935 |
| 2,233,191 | Arcier | Feb. 25, 1941 |